(12) United States Patent
Jaynes et al.

(10) Patent No.: US 10,320,865 B2
(45) Date of Patent: Jun. 11, 2019

(54) GRAPHICAL INDICATOR OF PRESENCE, IDENTITY, AND ACTION FOR MEDIA SHARING ON A DISPLAY

(71) Applicant: Mersive Technologies, Inc., Denver, CO (US)

(72) Inventors: Christopher O. Jaynes, Denver, CO (US); Jonathan Jaynes, Denver, CO (US); Michael Tolliver, Denver, CO (US); Scott Ruff, Denver, CO (US)

(73) Assignee: Mersive Technologies, Inc., Denver, CO (US)

( * ) Notice: Subject to any disclaimer, the term of this patent is extended or adjusted under 35 U.S.C. 154(b) by 457 days.

(21) Appl. No.: 14/012,977

(22) Filed: Aug. 28, 2013

(65) Prior Publication Data

US 2015/0067106 A1    Mar. 5, 2015

(51) Int. Cl.
*H04L 29/06* (2006.01)

(52) U.S. Cl.
CPC ...... *H04L 65/4038* (2013.01); *H04L 65/1089* (2013.01)

(58) Field of Classification Search
CPC .... G06F 3/1454; G06F 3/0481; G06F 3/0482; G06F 3/0484; G06F 3/04842; G06Q 10/103; H04L 51/046; H04L 65/403
USPC ........................................................ 709/204
See application file for complete search history.

(56) References Cited

U.S. PATENT DOCUMENTS 7,831,732 B1 * 11/2010 Zilist ...................... G06Q 10/00
                                                           709/217
2006/0136828 A1 * 6/2006 Asano ................... G06F 3/1454
                                                           715/733
2009/0217177 A1 * 8/2009 DeGrazia .............. G06F 3/0481
                                                           715/753
2011/0202854 A1 * 8/2011 Chan ..................... G06F 3/1454
                                                           715/762
2012/0084215 A1 * 4/2012 Trier ...................... G06Q 10/06
                                                           705/301
2012/0314018 A1    12/2012 Wengrovitz et al.
2014/0006500 A1 * 1/2014 van Rijkom ........ H04L 12/1895
                                                           709/204
2014/0025744 A1 * 1/2014 Kim ...................... G06F 3/1454
                                                           709/204
2014/0123053 A1 * 5/2014 Nakada ............... G06F 3/04845
                                                           715/778

(Continued)

OTHER PUBLICATIONS

International Search Report and Written Opinion corresponding to International Patent Application No. PCT/US2016/044581, dated Oct. 20, 2016, 7 pages.

*Primary Examiner* — Oleg Survillo
(74) *Attorney, Agent, or Firm* — Lathrop Gage LLP

(57) ABSTRACT

A method for graphically indicating presence, identity, and action with respect to a media post transmitted by a client device and displayed on a shared display. Metadata indicating the identity of a user is logically associated with visual media to form a media stream, which is transmitted to the shared display. The transmitted media stream is then decoded to recover the transmitted metadata. The media post is displayed on the shared display and the presence of a client device media stream, the identity of the current user of the device generating the stream, and an action associated with the user interaction with the client device, is then graphically indicated on the display, using the recovered metadata.

25 Claims, 3 Drawing Sheets

(56) References Cited

U.S. PATENT DOCUMENTS

| | | |
|---|---|---|
| 2014/0267577 A1 | 9/2014 | Weber et al. |
| 2015/0205462 A1* | 7/2015 | Jitkoff .................. G06F 3/0483 715/777 |
| 2015/0222700 A1* | 8/2015 | Kay .................... H04L 67/1095 709/203 |
| 2017/0003927 A1* | 1/2017 | Sik ........................ G06F 17/241 |

* cited by examiner

GRAPHICAL INDICATOR OF PRESENCE, IDENTITY, AND ACTION FOR MEDIA SHARING ON A DISPLAY

BACKGROUND

Because present media sharing technology supports multiple individuals being 'connected' to a display simultaneously, a graphical indicator is needed to convey information about the group to users of a shared display. There is a need for users who are near the display to determine the display resource load, how that display is currently being used, and other data about the display-as-a-resource.

SUMMARY

A graphical presence indicator in accordance with the present method and system can be used by participants in a room to learn who is connected to a shared display, how many users are connected, and, through a variety of animations, what users are active with particular actions. The indicator is an important addition to a display that is being used as a shared resource because it allows users who are near the display to determine the display resource load, how that display is currently being used, and other data about the display-as-a-resource. For example, one indicator may show whether the display is available for additional connections.

The present digital media sharing system allows any number of users to publish different media streams to single or multiple shared displays. The publication process involves three steps; 1) connecting to a display host, 2) selecting a media stream, and 3) publishing that stream to the display. Once connected, users can repeat steps 2 and 3. This disclosure describes a graphical connection indicator, deployed on a shared display, that provides information about display users and connection status.

The present graphical indication method is advantageous in multi-user displays where a number of people are sharing media on the same display screen. Unlike traditional tele-collaboration scenarios where user presence information is denoted at each of the users' endpoint displays, the present system combines indication of presence, identity, and action along with associated images on a single shared display. In this way, users that are not actively participating or are connected to a media sharing session with their own personal display, but who are in view of the shared display, can receive information that the graphical indicator carries (without requiring that the same information is displayed on the user's personal device). This is different, for example, from traditional video teleconferencing systems that provide a notification icon for users that have joined the session for each of the clients, on their own display, that are communicating in a peer-to-peer topology. Here, each client is connected to a centralized resource that then aggregates information from each source and displays that information graphically on a single shared display.

The present method allows a group of users who are sharing a display for collaboration, decision making, or entertainment, to quickly identify what users are connected to a display, which users are controlling which media elements, and to be informed of users exiting a session.

In one embodiment, a method is disclosed for graphically indicating presence, identity, and action with respect to a media post transmitted by a client device and displayed on a shared display. Initially, metadata is generated, either (1) initially, by a user, and then stored, or (2) in response to a user interaction with the client device. The metadata is combined with the media to form a media stream, which is transmitted to the shared display. The transmitted media stream is then decoded to recover the transmitted metadata. The media post is displayed on the shared display and the presence of a client device media stream, the identity of the current user of the device generating the stream, and an action associated with the user interaction with the client device, is then graphically indicated on the display, using the recovered metadata.

DETAILED DESCRIPTION

Figure 1:
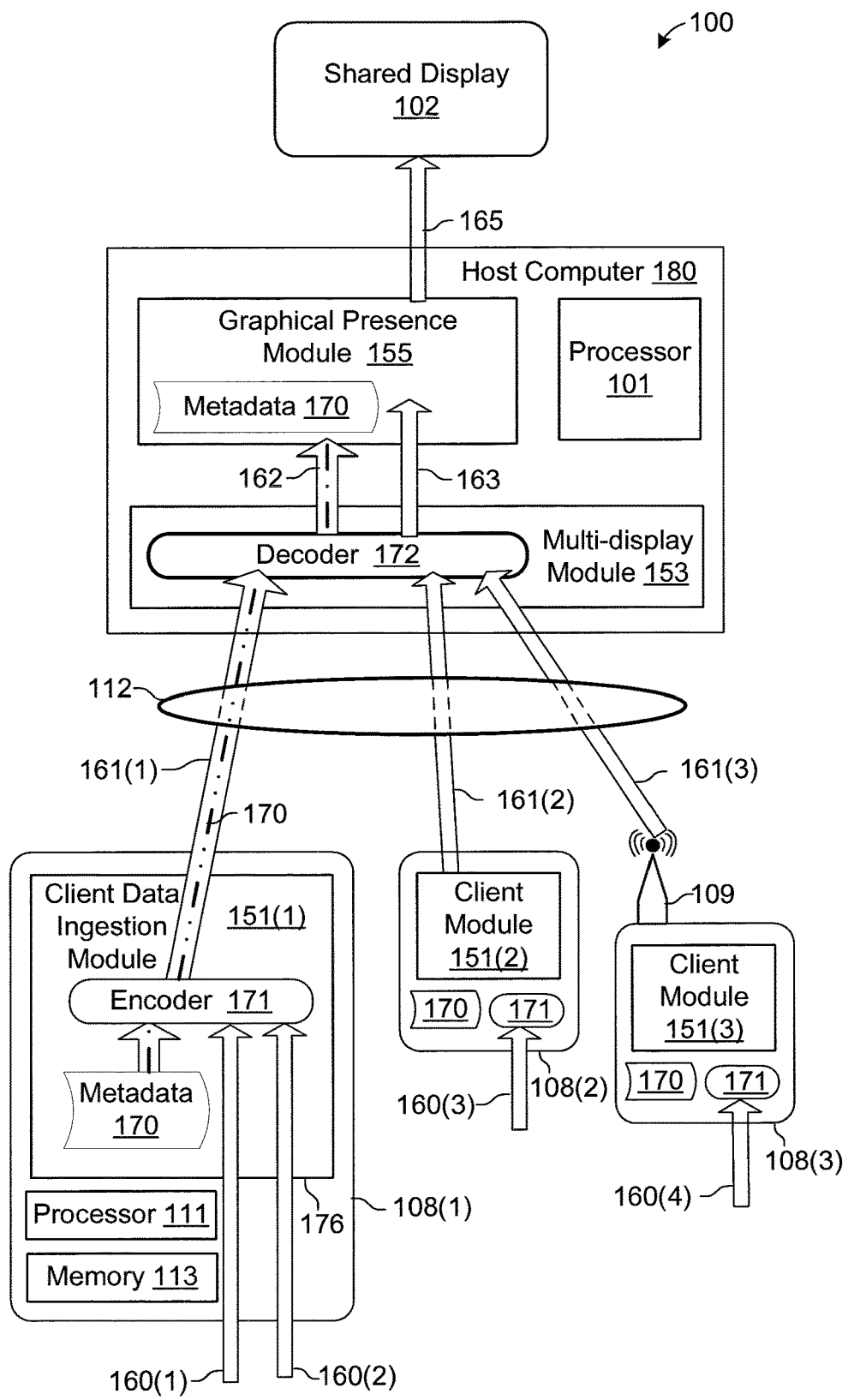
FIG. 1 is an exemplary diagram of components for providing graphical indication of user presence, identity, and action, in accordance with one embodiment of the present system.

FIG. 1 is an exemplary diagram of components for providing graphical indication of user presence, identity, and action, in accordance with one embodiment of the present system 100. As shown in FIG. 1, one or more client display devices 108(*) [where "*" indicates any member of a similarly-referenced-numbered group of items] connect to a display host computer 180 over a network 112 (wired or wireless) via a connection and communications protocol, for example, TCP/IP or SCTP. The connection of client devices (or simply "clients") 108 to network 112 can be provided via cable or via an untethered wireless communication device 109.

Host computer 180, which can be a PC or other type of computing device, includes a processor 101 which executes software (and/or firmware) applications including multi-display module 153 and graphical presence module 155, the operation of both of which is described in detail below. Multi-display module 153 is coupled to a data stream decoder 172, which receives client media streams 161 and decodes them into data streams 162 containing extracted metadata 170 and an aggregate (composite) shared video stream 163. Graphical presence module 155 processes extracted metadata 170 to provide an augmented composite video stream 165 indicating user presence, identity, and action information on at least one shared display 102.

Each client display device 108 includes a display 176, and a processor 111 and associated memory 113 which executes software modules described herein including modules 151. Display device 108 may be a device such as a PC (personal computer) or laptop computer 108(1), or a hand-held device such as a 'smartphone' 108(3) or tablet 108(2). Each client display device 108(*) includes a client data ingestion module ("client module") 151(*) that is able to select and ingest data from various media sources or streams 160(*). These sources can be application windows on a standard PC or other computers, the video screen of a 'smartphone' 108(3) or tablet 108(2), and/or other digital video/image sources.

Figure 2:
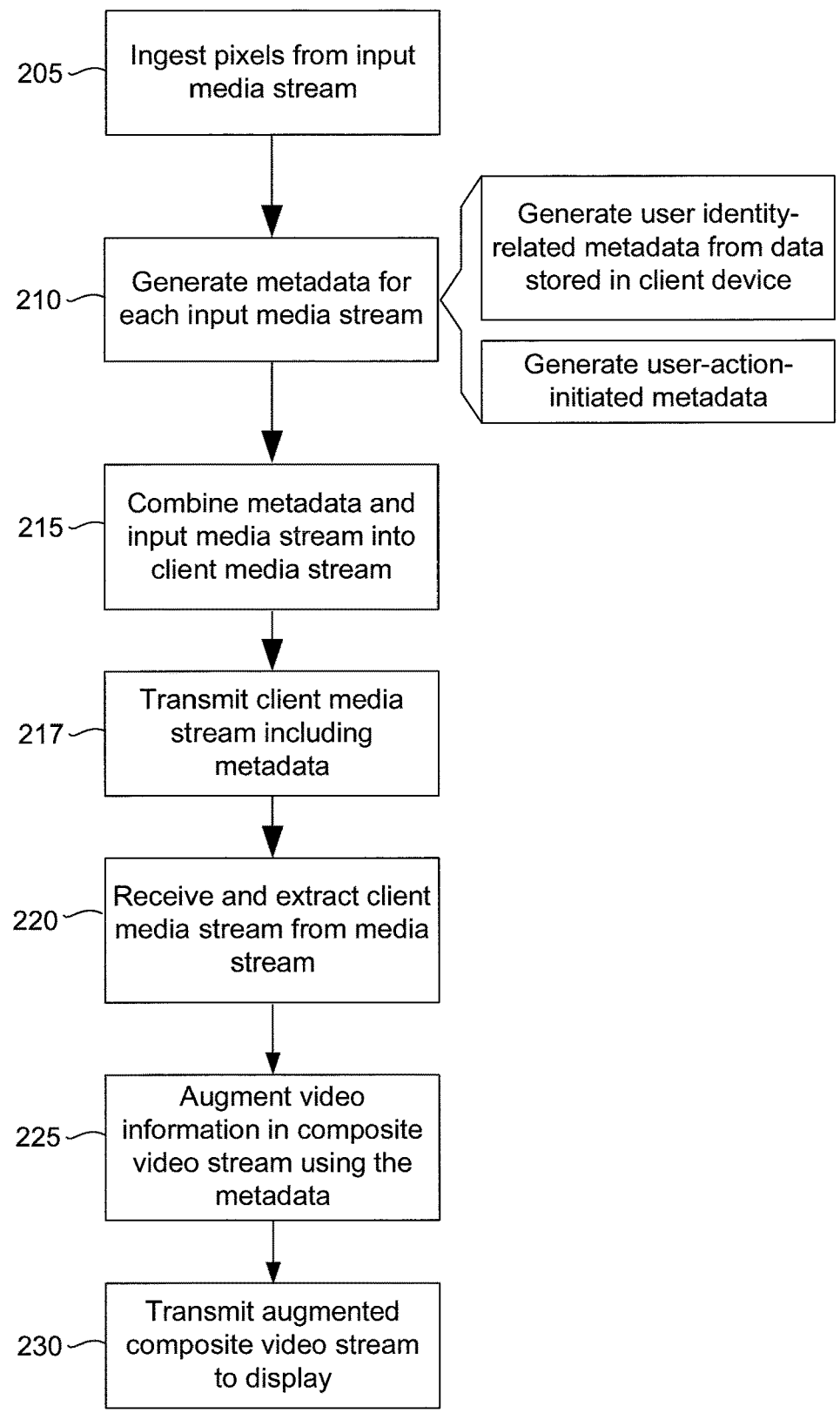
FIG. 2 is a flowchart showing an exemplary set of steps performed in one embodiment of the present method.

FIG. 2 is a flowchart showing an exemplary set of steps performed in one embodiment of the present method, which is best understood by viewing FIGS. 1 and 2 in conjunction with one another. As shown in FIG. 2, at step 205, display pixels comprising a media post from a client device 108 are ingested from a client input media stream 160(*) by client data ingestion module 151(*). As shown in the example of FIG. 1, input media streams 160(1) and 160(2) are client video sources from two application windows on a PC or the like. Possible video sources for streams 160(*) include, e.g., PC application windows, media on DVD, changing (or static) pixels contained within an PC desktop application window, an encoded video file stored on the client, one or more images, changing images in a web browser, cable television, a teleconferencing stream, or the full desktop of a PC. As shown in detail for client 108(1), in step 205, one or more input media streams 160 (streams 160(1) and 160(2) are shown in the FIG. 1 example) are input to encoder 171 and then processed, as described below, by client module 151(1) running on processor 111.

At step 210, metadata 170 for each input media stream 160(*) is generated by respective client module 151(*). In response to a user interaction with the client device, user-action-initiated metadata 170 is generated. Specific user-action-initiated metadata is specifically associated with the user interaction [as determined by reference to a list (such as a look-up-table) of user interactions and corresponding metadata. User actions are translated into a metadata packet that is then sent to the display. This packet will contain the user ID, and the action metadata. In one embodiment, this is accomplished via a lookup table, on the client device, that takes user interactions and associates them with metadata packets. Alternatively, a metadata generator can be hard-coded into the client device. User identity-related metadata is generated from data stored in the client device.

In step 210, metadata inserted into a 'packet' as a result of some user action (by a client 108) is then 'deciphered' (by host 180) to generate corresponding indicators including, for example, indicia of animation, text information, add'l icon/text, size of media post on shared screen, and commands, such as "move", which indicates the media post displacement from a previous position, "resize", which indicates the media post scale transform from its current size, or "delete", which indicates the media post is being removed from the shared display, etc.

For example, client A establishes a connection to a multi-display module 153 that is currently connected to client B. If client B has transmitted a media stream and client A initiates a "move" command on the client A user interface module—the translation data (e.g., x/y offset) is combined with the metadata that indicates a move action from client A has just occurred. In this case, the multi-display module 153 receives the combined information and extracts both the metadata and the command itself.

Metadata 170 includes user/client information specifically related to a client device 108 and/or its user, such as name, user ID, geographical position data and user preferences, as well as temporal information such as recent activity. The user/client information is entered into memory, via module 151, by a user prior to transmission of a client video source 160. In addition, metadata 170 can include information related to user actions that change over time. For example, a media stream 160 may include metadata information about which media stream a client last moved on a shared display, when that client first posted video to the display, and how many media sources that client is presently ingesting and then presenting on the shared display 102. This metadata can subsequently be used by the graphical presence module 155 to annotate display 102 in accordance with the above user actions and user-related data.

At step 215, encoder 171 receives and combines metadata 170 and input media stream(s) 160(*) into a single client media stream 161(*). These 'combined' metadata and input media streams are at least logically combined (logically associated), but are not necessarily transmitted on the same TCP/IP socket (or other) stream, for example. At step 217, client media stream 161(*) including metadata 170 is transmitted to a host multi-display module 153 on display host computer (host PC) 180 via network 112 as a client media stream 161 that is interpreted by the host multi-display module 153 into a graphical representation that can be drawn to the single shared screen 102.

Each media stream 161(*) includes source media encoded (or re-encoded) via encoder 171, with metadata 170 associated with a respective client device 108(*). For example, the set of client media streams may include an H.264 video encoded stream of video and audio data that is transmitted in conjunction with a set of metadata to the receiver module. Video may be transmitted, for example, at 60 Hz, while metadata information may be periodically sent through the network when it changes (i.e., when a user moves an image or disconnects). 'Persistence of display' of metadata-related graphical information (e.g., the information conveyed by a presence indicator such as icon 305) is provided by graphical presence module 155, which maintains a constant presence indication output (which is a component of composite video stream 165) until one or more presence/identity/action-related parameters are observed in received metadata 170.

Client data ingestion module 151 detects user actions with respect to device 108 and accordingly generates the corresponding metadata at appropriate times. User actions are detected by this module by receiving an appropriate trigger from the user-interface on the client module itself. Such user interface triggers can include moving the joystick, pushing buttons, selecting items, etc. In addition, the client data ingestion module 151 can also generate metadata based on the set of user-interface actions over time (pushing buttons in a sequence) or the lack of activity over time.

At step 220, client media streams 161 are received by the display host and decoded by decoder 172 into a data stream 162 containing extracted metadata 170, and composite shared video stream 163 including each of the client video sources 160. Host multi-display module 153 determines how the various streams 161 (which were originally respective input media streams 160), across multiple devices 108, are aggregated into composite stream 163, which is ultimately displayed on the shared display 102 in accordance with parameters indicating the relative position and scale of the displayed media stream or 'media post'.

The appearance, on display 102, of the various streams is defined by one or more of the users and indicia thereof transmitted via the metadata 170. For example, a image scale change, indicated by a user, is encoded as part of the metadata information and then decoded and used to modify the scale appearance of the appropriate media stream 161. This metadata is then reflected in the appearance of a graphical presence indicator, such as an icon 305(*) (shown in FIG. 3) on the shared display. Other appearance parameters include moving, deleting, adding, and changing layout preferences indicated from each user at their corresponding interface.

In step 220, host multi-display module 153 aggregates multiple streams 161 contained in aggregate (composite) stream 163 into a augmented composite video stream (or signal) 165 forming, at any given time, a single coherent image based on the video data received as well as metadata generated by clients. For example, in a two-user display sharing session, each user may decide to share the output of two different applications each on their respective desktops.

In this case, the two client streams (each containing video data and metadata associated with 2 different input sources) are then aggregated, for example, into a 2×2 rendering of the input streams that can be displayed on a single screen 102.

Figure 3:
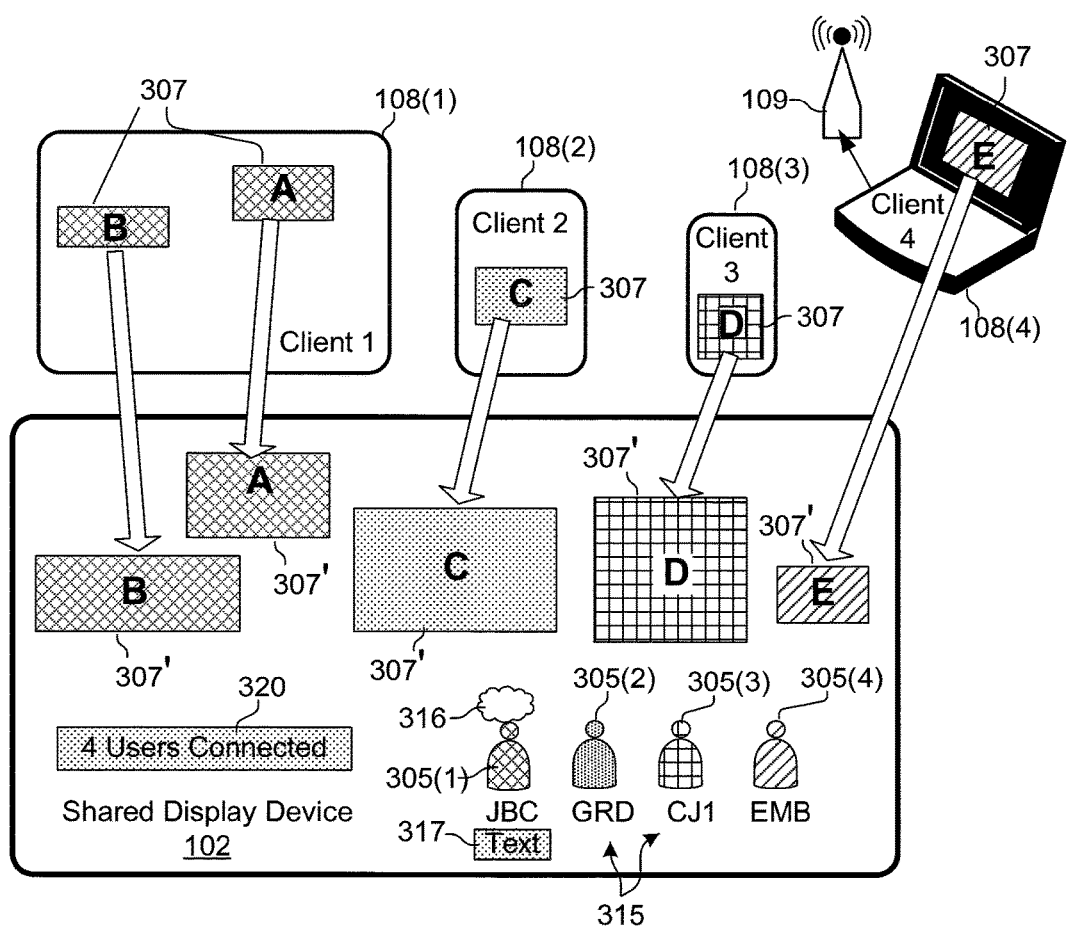
FIG. 3 depicts one example of a graphical interpretation of client specific metadata as employed by the present system.

Presence, identity, and action display module ("graphical presence module") 155 is a software component that receives metadata 170 from the various client media streams 160/161 and creates a graphical interpretation of that data for display that is combined with the aggregate image 163 being produced by host multi-display module 153. At step 225, graphical presence module 155 augments video information in composite video stream 163 from potentially many client media streams 161, using received metadata 170 to generate an augmented composite video stream 165, which is transmitted to display 102 at step 230. An example of a resulting displayed composite image is shown in FIG. 3, described below.

Augmented composite stream 165 contains (1) formatted images included in respective media streams 161, and (2) information representing each respective client 108 presently transmitting a media stream, for generating user-related information including presence indicators 305, 315, 316, 317, 320, and related animations to reflect presence, activity, user class/type, access rights, etc. Thus, an observer of the shared display 102 may learn information about connected clients 108.

From the example above, in which client A has used the client module interface to translate a media stream on the display, a metadata packet is sent to host 180 that includes a "translate" event and the user ID of client A. Other types of metadata can be carried in a metadata packet that are not directly related to the geometric position (or change thereof) for media posts. For example, a metadata packet may carry information about the host computer operating system being used by the client module. This metadata is interpreted by graphical presence module 155 to cause the augmented composite video stream 165 to render a small icon next to each post that denotes the host operating system of the originating source. Generically, a metadata packet may contain information including information such as:

user name, user ID or tag 315, user class/type, access rights, user state, time logged on, time of last activity, position and size of media post 307', position and color of associated icon 305, type of animation, layout preference, client module operating system, client hardware profile additional text, activity type, geographic position of host (e.g., GPS location) (315, 317, 320), secondary icon 316 (& type of animation), etc.

Metadata can be communicated through a variety of protocols including TCP/IP Socket Streams or Remote Procedure Calls (RPC). For example, if a client initiates a "translate to X,Y" command, the metadata packet may be constructed through an RPC call stream initiated by the client, in the following exemplary format:

Uint8 messageType
UUID objectId
Uint16 methodId
UUID uiniqueCallId
Bytes (optional)serializedCallData messageType: This field is set to a value indicating that the metadata information should be acknowledge via a blocking or non-blocking call.
objectId: This field is set to the user ID of the stream that is initiated the "translate" action associated with the metadata.
methodId: An integer value corresponding to the real method call that needs to be executed on the server. In an example where the call is "translate", then this is a unique identifier that points to the translate animation indicator function. This function on the server can then create the appropriate indicator on the server display (via the Graphical Presence Module).
uiniqueCallId: A unique id for every RPC call made that is used to match up calls from the client with responses from the server.
serializedCallData: This is a stream of bytes containing all parameter data. This data is optional. If the method does not require parameters, then this field will be empty. In the case that the data is a translate call this contains parameters X/Y.

The above example describes a general framework for communicating data to a host 180, and any other applicable set of data/indicators/functions can be selected, communicated, and then interpreted by the host using this general mechanism.

FIG. 3 depicts one example (shown on shared display device 102) of a graphical interpretation, generated by graphical presence module 155, from client-specific metadata 170 in augmented composite video stream 165. As shown in the example of FIG. 3, display device 108(1) for client 1 is displaying media posts labeled "A" and "B", display device 108(2) is displaying media post "C", display device 108(3) is displaying media post "D", and display device 108(4) is displaying media post "E". As indicated by the arrows in FIG. 3, each of the media posts A-E (307') shown on shared display 102 is an image of a respective client window (or application) 307, which is generated by host multi-display module 153.

In the FIG. 3 example, four client modules **108(*) have connected to the single shared display 102. Each of the users is depicted as a respective user icon 305(*) with a unique color, at the base of the screen, as indicated by the unique cross-hatching/shading for each user icon. Indicia of user identity 315, for example, a user's initials (e.g., "ORD"), or an identifying tag (e.g., "CJ1"), received by graphical presence module 155, is drawn beneath each user icon 305(*)**.

Action information for operations such as deleting media is indicated through animations that involve the individual user icon 305 that corresponds the client stream 161 that requested the operation (e.g., that deleted the media).

Information that can be received as metadata 170 and then graphically displayed on a shared display 102 includes, for example:

The number of individual clients 108 connected to the display 102 may be indicated either explicitly as text on a presence bar 320, or implicitly by displaying a new icon for each client that is connected.

Identification information related to each client may be indicated by drawing the name 315 of the connected user on the display, a color-coded or specifically shaped icon 305, or both.

User class and access rights may be indicated by denoting, per-user, their capabilities by drawing a 'secondary' icon 316 near that users' icon 305, for example by drawing a secondary icon (such as a badge) that indicates a user is a "presenter", "owner", or "audience member".

Location information for each client 151 and associated user can be indicated by drawing each individual icon 305 in a relative position that denotes a geospatial indication of the source. For example, by grouping user indicator icons based on which region of the country each user is in, ordering their positions on the presence bar 320, or by simply drawing text 317 that denotes a city (or other source) of origin for each user.

Platform-specific information including hardware (e.g., laptop PC, iPad, etc.) and operating system (e.g., MacOS®, Windows®) that a client is using may be indicated through either a text indicator 317 or a graphical icon 316 located in proximity to the respective user.

Actions that may be taken by individual clients, and indicated in the form of animations. These actions include, for example, the following:

entrance: an appearance of a new user icon 305 can be animated, potentially repositioning existing icons to make room for a new user and fading in the new icon.

exit: an exit event can be animated by fading the user icon 305 until it disappears, and potentially repositioning existing icons to take advantage of the additional room on the display.

adding a new stream of data: any desired type of animation can be employed to indicate a temporal activity on a per-user basis, as for example, a new stream 161 can be animated to appear near the associated user icon 305 and at a relative size that is similar to the icon, and then animated to translate and scale into position on the screen over some period of time. This allows a particular graphical presence indicator 305, 315, 316, 317, 320 to inform viewers about which user published a particular media post 307. Other examples include 'glowing' the base of the icon 305 for the user that has published the new stream, and animating a line from the user icon to the media post.

In animating a video display 102, the video/pixel data drawn to the display is drawn in a specific position/scale based on user input/control preferences. For example, a media stream can be translated (moved across a display screen) as it is playing. In addition, user metadata relating to a particular action can impact the way in which a media stream is positioned or scaled or otherwise appears over time. As an example, consider streaming a video that is almost full screen. When the user exits, the video stream is made to gradually diminish by scaling/translating it towards the associated icon until it disappears, during which time the video data is still playing.

Deleting a media element can be indicated by animation using the inverse order of the animations used in the 'adding' action. Similar animations can be used to denote other actions, for example, when a user selects a new layout, an icon 305 may 'glow', or a secondary icon 316 indicating a certain action can be rendered near or on the user icon that performed the action.

User preferences, such as whether a particular user is allowing their media posts to be archived and shared with other users, or if the user has disallowed this in their pre-established preferences, can be denoted graphically via a presence indicator, for example, indicator 316 or 317. User preferences can include aspects of security and access to their data, sharing rules about data streams and other data (e.g., if a user's email address is shared), whether or not that user is in a specific class (e.g., administrator).

The status of the user (idle, active) of each client device 108 can be denoted to the group by rendering an icon 316 (e.g., a cloud) over the user icon 305, indicating that the user has gone idle. The status of the client hardware/OS (e.g., percentage of memory used, percentage of CPU utilization) may also be indicated in a text message via, for example, presence indicator 317

Having described the invention in detail and by reference to specific embodiments thereof, it will be apparent that modifications and variations are possible without departing from the scope of the invention defined in the appended claims. More specifically, it is contemplated that the present system is not limited to the specifically-disclosed aspects thereof.

The invention claimed is:

1. A method for graphically indicating action with respect to a media post transmitted by a client device and displayed on a shared display on which is displayed a plurality of said media posts comprising:

receiving, at a host computer from each of a plurality of client devices, a client device media stream including a media post logically associated with user-action-initiated metadata, the user-action-initiated metadata being in response to user interaction with respective one of a plurality of client devices, and defining an action to be taken with respect to a media post on a shared display, the host computer being connected to a shared display device and remote from each of the client devices;

decoding, via the host computer, each of the client device media streams to recover the transmitted user-action-initiated metadata therefrom; and controlling, by the host computer, display of each of the media posts on the shared display and graphical indication, on the shared display, of an action associated with the user interaction with the client device as determined from the recovered user-action-initiated metadata.

2. The method of claim 1, wherein the graphical indication of the action with respect to the media post is displayed on the shared display only, and not transmitted to a client device.

3. The method of claim 1, wherein the host computer controls the shared display to indicate action information through animation of an icon, displayed on the shared display, that corresponds to the client device media stream requesting an operation that triggers the animation.

4. The method of claim 1, wherein the host computer controls the shared display to indicate the presence of the client device media stream and the identity of the user of the device generating the media stream by respective indicia displayed on the shared display.

5. The method of claim 1, wherein the host computer controls the shared display to indicate identity of the user of the device generating the media stream by an icon.

6. The method of claim 1, wherein the host computer controls the shared display to display information indicating the number of users presently transmitting media streams to the host computer.

7. A method for graphically indicating presence with respect to a media post transmitted by a client device and displayed on a shared display on which is displayed a plurality of said media posts comprising:

receiving, from each of a plurality of client devices, at least one client device media stream each including a media post at a host computer, the host computer being separate from each of the plurality of client devices and connected to the shared display; and each media post being logically associated with user identity metadata and user action-initiated metadata
wherein the user identity metadata includes identity of a current user of each of the plurality of client devices, and
wherein the user-action-initiated metadata is based on a user interaction with each of the respective client devices and defines an action to be taken with respect to the media post associated with the respective client device on the shared display decoding, via the host computer, each of the received client device media streams to recover the user identity metadata and user-action-initiated metadata therefrom;

wherein the identity of the current user of the respective client device generating the client device media stream is determined from the recovered user identity metadata, and wherein graphical indication, on the shared display, of the presence and identity of the current user is associated with one or more media streams as determined from the recovered user identity metadata;

controlling display, by the host computer, of each of the media posts on the shared display according to the user-action-initiated metadata and graphically indicating, on the display, presence of each of the client device media streams.

8. A method for graphically indicating presence and identity with respect to a media post transmitted by a client device and displayed on a shared display on which is displayed a plurality of said media posts comprising:

receiving, at a host computer from each of a plurality of client devices, a client device media stream, each media stream including a media post logically associated with user identity metadata including the identity of a current user of a respective one of a plurality of client devices and user-action-initiated metadata defining an action to be taken with respect to a respective media post on a shared display at the host computer, the host computer being connected to a shared display device and remote from each of the client devices decoding, via the host computer, each of the received client device media stream to recover the user identity metadata and the user-action-initiated metadata therefrom; and controlling, by the host computer, display of each of the media posts on the shared display according to the user interaction and graphical indication, on the shared display, the presence of the respective client device media stream and the identity of the respective current user of the device generating the respective media stream as determined from the recovered user identity metadata and the user-action-initiated metadata.

9. The method of claim 8, wherein the graphical indication of the presence and identity of the media posts is displayed on the shared display only, and not transmitted to a client device.

10. The method of claim 8, wherein the host computer controls the shared display to display information indicating the number of users presently transmitting media streams to the host computer on the shared display.

11. The method of claim 8, wherein the host computer controls the shared display to indicate the presence of each of the client device media streams and the identity of the current user of the device generating the respective media stream by respective indicia displayed on the shared display.

12. The method of claim 8, wherein the host computer controls the shared display to indicate the identity of the current user of the device generating the respective client device media stream by an icon displayed on the shared display.

13. The method of claim 12, wherein the host computer controls the shared display to indicate action information through animation of the icon corresponding to the client device media stream requesting an operation that triggers the animation.

14. A method for graphically indicating presence, identity, and action with respect to a media post transmitted by a client device and displayed on a shared display on which is displayed a plurality of said media posts comprising:

receiving, at a host computer from each of a plurality of client devices, a client device media stream including a media post logically associated with user information metadata and user-action-initiated metadata, wherein the user information metadata is from previously-stored user information including the identity of a user of the client device, and wherein the user-action-initiated metadata is in response to a user interaction with the respective client device and defines an action to be taken with respect to the media post on the shared display, the host computer being connected to a shared display device and remote from each of the client devices;

decoding, via the host computer, the transmitted client device media stream to recover the transmitted metadata therefrom; and controlling, by the host computer, display of each of the media posts on the shared display and graphical indication, on the shared display, of the presence of the client device media stream, the identity of a current user of the device generating the client device media stream, and an action associated with the user interaction with the client device, as determined from the recovered transmitted metadata.

15. The method of claim 14, wherein the host computer controls the shared display to display information indicating the number of users presently transmitting media streams to the host computer.

16. The method of claim 14, wherein the graphical indication of the action with respect to the media post is displayed on the shared display only, and not transmitted to a client device.

17. The method of claim 14, wherein the host computer controls the shared display to indicate action information through animation of an icon, displayed on the shared display, that corresponds to the media stream requesting an operation that triggers the animation.

18. The method of claim 14, wherein the host computer controls the shared display to indicate the presence of the client device media stream and the identity of the current user of the device generating the media stream by respective indicia displayed on the shared display.

19. The method of claim 14, wherein the host computer controls the shared display to indicate the identity of the current user of the device generating the client device media stream by an icon.

20. A system for graphically indicating presence and identity with respect to a media post transmitted by a client device and displayed on a shared display comprising:

a host computer connected to a shared display and separate from a plurality of client devices;

the host display storing a plurality of client media streams each received from one of the plurality of client devices, each client media stream including a media post logically associated with user identity metadata indicating user information including the identity of a user of each of the client devices and user-action-initiated metadata defining an action to be taken with respect to the media post on the shared display, the media post including display pixels of the client display device associated with the respective the client media stream;

the host computer executing a multi-display module and a graphical presence module;

a decoder coupled to the host computer;

wherein the multi-display module controls the decoder to receive each of the client media streams and decode the respective client media stream into respective augmented data streams each containing extracted said user identity metadata and said user-action-initiated metadata and a video stream containing the media post; and wherein the graphical presence module processes the extracted metadata to provide an augmented video stream indicating user presence and identity information to the shared display according to the user interaction information.

21. The system of claim 20, wherein:

the graphical presence module further controls the shared display to graphically indicate an action associated with the user action with the client device as determined from the recovered transmitted metadata.

22. The system of claim 20, wherein the host computer controls the shared display to display information indicating the number of users presently transmitting media streams to the host computer.

23. The system of claim 20, wherein the host computer controls the shared display to indicate action information through animation of an icon, displayed on the shared display, that corresponds to the media stream requesting an operation that triggers the animation.

24. The system of claim 20, wherein the host computer controls the shared display to indicate the presence of the media stream and the identity of the user of the device generating the media stream by respective indicia displayed on the shared display.

25. The system of claim 20, wherein the host computer controls the shared display to indicate the identity of the user of the device generating the media stream by an icon.

* * * * *